Oct. 21, 1930.  J. D. MACRAE ET AL  1,779,180
LAMP FOR VEHICLES
Filed Aug. 23, 1929
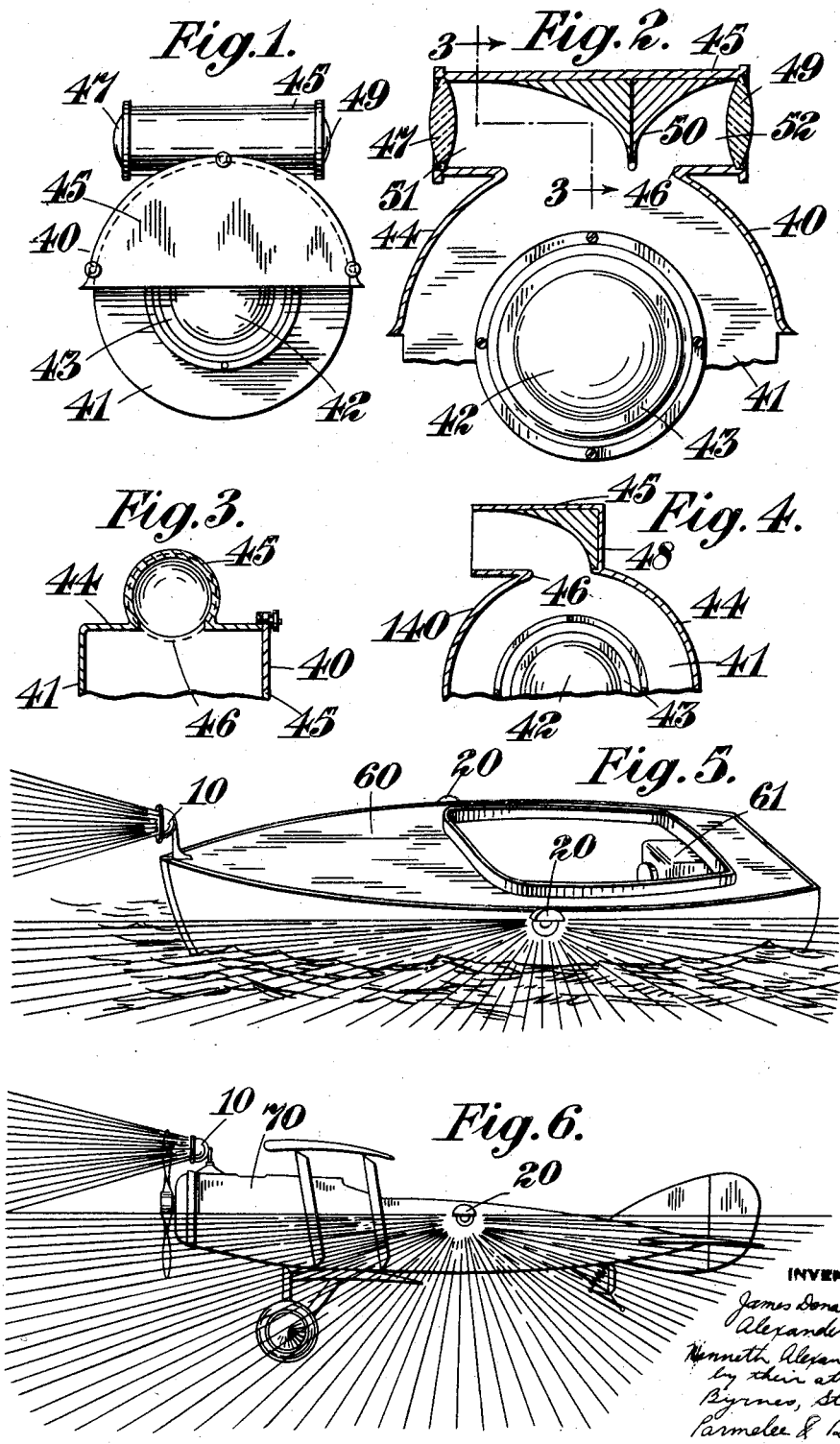

Patented Oct. 21, 1930

1,779,180

UNITED STATES PATENT OFFICE

JAMES DONALD MACRAE, ALEXANDER MACDONALD, AND KENNETH ALEXANDER MACRAE, OF BONAR-BRIDGE, SCOTLAND

LAMP FOR VEHICLES

Application filed August 23, 1929, Serial No. 387,925, and in Great Britain October 6, 1928.

This invention relates to side lamps for vehicles arranged as described in the specification of the patent application, Serial No. 238,122 filed 6th December, 1927. According to the said specification there is provided the combination with a vehicle, such as a motor vehicle, having one or more headlights of the brilliant type, of an auxiliary lamp or lamps to be operative whilst the headlights are also fully operative, which auxiliary lamp or lamps are so arranged on one or both sides of the body of the vehicle at the rear of the headlights (e. g. between the windscreen and the rear end of the vehicle), that, when operative, they illuminate each a background constituted by substantially the whole of one side of the vehicle, and the road at the side of the vehicle, situated behind the headlights and thereby reduce the contrast between the brilliant light of the headlights and the dark background which would otherwise exist, the source or sources of light of which auxiliary lamp or lamps are so arranged as to be invisible from in front of the vehicle by the driver of an approaching vehicle and also from the side of the vehicle by pedestrians, which auxiliary lamp or lamps provide each a beam having a wide angle fore-and-aft of the vehicle and in a direction laterally thereof.

When this arrangement of lamps for obviating the glare and dazzle of the brilliant headlamps is employed, it may be necessary also to provide on the vehicle side lamps showing a white light to the front in order to comply with legal requirements regulating road traffic, and the present invention has for its object to enable such additional side lamps to be dispensed with when the safety system of lighting vehicle described in the said specification is employed.

According to the present invention, an auxiliary lamp aforesaid wherein the source of light, such as the filament of an electric bulb, has above it a reflector, such as a semi-cylindrical reflector, which is arranged to reflect the light fore and aft of the vehicle and downwards, and which has its lower edges substantially level with or below the source of light, and wherein an obturator is provided, for example detachably, on the reflector at the side of the source of light remote from the vehicle, is characterized in that an aperture for light is provided in the said reflector, for example above the source of light, at a situation such that a beam of diffused or reflected light will be projected through it towards the front of the vehicle whilst the source of light will remain screened from, for example invisible to, the driver of an approaching vehicle, in order that the auxiliary lamp may serve as a side lamp instead of the side lamps usually provided elsewhere on the vehicle, for example on the front-wheel mud-guards.

According to a feature of the invention, the said aperture for light is formed in the upper part of the reflector and opens upwards into a horizontal tube that lies in the fore-and-aft direction of the vehicle and is open to light rays at the front, the inner wall of which tube is of a light-reflecting character. If desired, translucent material, such as a lens, may be provided in the front end of the tube which may have its rear end closed to light rays.

The invention is diagrammatically illustrated, by way of example, in the accompanying drawing, wherein:—

Figure 1 is a side elevation showing one form of side lamp according to the invention;

Figure 2 is a longitudinal section through the same, and

Figure 3 is a transverse section taken on the bent line 3—3 in Figure 2;

Figure 4 is a longitudinal section through a modified construction of lamp, and

Figures 5 and 6 are perspective view and side elevation respectively showing respectively a motor boat and an aeroplane having lamps according to the invention.

Like reference characters designate like parts throughout the several views.

Referring to the drawing, an auxiliary or side lamp, designated generally 40 in Figures 1 to 3 and 140 in Figure 4, comprises a base plate 41, preferably circular, which can be mounted on the side of a vehicle and is arranged to carry an electric lamp bulb 42 which may be protected by a glass 43. A semi-cylindrical reflector 44 is arranged on the base plate above the lamp so as to reflect the light fore-and-aft of the vehicle and downwards, and a semi-cylindrical obturator 45 is mounted, preferably detachably, on the reflector 44 and arranged to cut off certain lateral rays from the lamp. As described so far, this construction is the same as that of the side lamps 20 shown in Figures 5 and 6, which are similar to the corresponding lamps described in the prior specification aforesaid.

In the lamp 40 shown in Figures 1 to 3, there is mounted in the fore-and-aft direction of the vehicle on the semi-cylindrical reflector 44 a cylindrical tube 45 which is polished internally and opens downwards into the semi-cylindrical reflector through an aperture 46 in the top of the latter. The front end of the tube may be left open as shown in Figure 4, or it may be closed by a piece of translucent material, such as a clear or frosted glass lens 47 held in place in any convenient manner, as by a safety ring. The rear end of the tube may be closed by opaque material 48, as shown in Figure 4, or alternatively it may be left open or it may be closed with translucent material, for example a red glass lens 49, as shown in Figures 1 and 2, in order that the auxiliary lamp may also serve as a rear lamp. Owing to the tube being situated above the source of light, a beam of diffused or reflected light of low intensity will be directed by it towards the front and will be visible to an approaching driver, so that the described lamp will serve the purpose of a side lamp as used heretofore on a mudguard. The said beam will, however, not cause any inconvenience whatever to the driver of the approaching vehicle and the auxiliary lamp will still serve its main purpose, as described in the prior specification, of diminishing or eliminating the annoyance caused by glare or dazzle of the headlights. Likewise, if the rear beam of light is provided it will also be of low intensity, and will not cause any annoyance or inconvenience in any way or prejudicially affect the lighting of the side of the vehicle.

When forwardly- and rearwardly-directed beams of light are to be emitted through the tube 45 the aperture 46 may be divided into two parts, a larger and a smaller, by a diaphragm 50 extending upwards from the aperture into the tube, thus dividing the tube also into two compartments, a larger 51 and a smaller 52. This diaphragm may have highly reflecting surfaces on both sides and may constitute a reflector serving for reflecting light from the source of light through the two ends of the tube. The larger compartment 51 is preferably situated towards the front and serves for producing the forwardly-directed beam of white light, whilst the smaller compartment 52 may serve for throwing a beam of red light to the rear. If desired, the opposite reflecting surfaces of the diaphragm may be situated at an angle to one another or, alternatively, they may be concave, e. g. parabolic or substantially so, as shown. Besides serving as a reflector for intensifying the forwardly- and rearwardly-directed beams of light, the diaphragm 50 prevents a dark or black spot from being visible when viewed from the front due to the red glass at the rear end of the tube. The rear closed end of the tube 45 shown in Figure 4 is also preferably shaped similarly as a parabolic reflector.

When the invention is applied to a motor boat such as 60 shown in Figure 5 having a motor 61, the auxiliary lamps 20, or lamps 40 or 140 as described above, may be arranged at any convenient situation along the side or sides of the boat so as effectively to illuminate as large an area thereof as possible, a headlamp 10 being fixed at the bow of the boat. The invention may also be applied in an analogous manner to larger vessels that ply on water, for example steamers and sailing vessels.

When the invention is applied to an aeroplane, such as 70 shown in Figure 6, the auxiliary side lamp or lamps 20, may be mounted on the fuselage, as shown, or on a plane, for example at or towards the tip thereof, in such a position as to illuminate as much as possible the side of the fuselage and also the plane or planes. Side lamps 40 or 140, as described above, may also be used in this manner. A headlamp 10 of the brilliant type may be mounted in front of the cockpit. In the case of an airship the auxiliary lamps may conveniently be mounted on the outside of the gondolas.

We claim:—

1. A side lamp for a vehicle having a source of light, in the form of the filament of an electric bulb, and above the latter a semi-cylindrical reflector which is arranged to reflect the light fore-and-aft of the vehicle and downwards, and which has its lower edges level with or below the source of light, and a semi-circular obturator detachably provided on the end of the reflector at the side of the source of light remote from the vehicle, the semi-cylindrical reflector having an aperture at a situation such that a beam of diffused or reflected light will be projected through it towards the front of the vehicle whilst the source of light will remain screened from the driver of an approaching vehicle.

2. A side lamp for a vehicle having a source of light, in the form of the filament of an electric bulb, and above the latter a semi-cylindrical reflector which is arranged to reflect the light fore-and-aft of the vehicle and downwards, and which has its lower edges level with or below the source of light, and a semi-circular obturator detachably provided on the end of the reflector at the side of the source of light remote from the vehicle, and a horizontal tube mounted on and opening downwardly into said semi-cylindrical reflector and open to light rays at the front.

3. A side lamp for a vehicle having a source of light, in the form of the filament of an electric bulb, and above the latter a semi-cylindrical reflector which is arranged to reflect the light fore-and-aft of the vehicle and downwards, and which has its lower edges level with or below the source of light, and a semi-circular obturator detachably provided on the end of the reflector at the side of the source of light remote from the vehicle, and a horizontal tube mounted on and opening downwardly into said semi-cylindrical reflector and open to light rays at the front and at the rear.

4. A side lamp for a vehicle having a source of light, in the form of the filament of an electric bulb, and above the latter a semi-cylindrical reflector arranged to reflect the light fore-and-aft of the vehicle and downwards, and which has its lower edges level with or below the source of light, and a semi-circular obturator detachably provided on the end of the reflector at the side of the source of light remote from the vehicle, which semi-cylindrical reflector has an aperture at the top thereof, a horizontal tube open to light rays at both ends and mounted on said semi-cylindrical reflector and opening downwardly through said aperture, and a diaphragm extending downwardly in said tube towards said aperture at a situation nearer the rear edge of the latter than the front edge.

5. A side lamp according to claim 4, wherein the opposed front and rear sides of said diaphragm are formed as parabolic reflecting surfaces, and each end of the tube is closed by a lens.

In testimony whereof we affix our signatures.

JAMES DONALD MACRAE.
ALEXANDER MACDONALD.
KENNETH ALEXANDER MACRAE.